United States Patent
Adolph et al.

(10) Patent No.: US 6,649,906 B2
(45) Date of Patent: Nov. 18, 2003

(54) METHOD AND APPARATUS FOR SAFELY OPERATING RADIATION GENERATORS IN WHILE-DRILLING AND WHILE-TRIPPING APPLICATIONS

(75) Inventors: Robert A. Adolph, Houston, TX (US); Loïc Vildé, Houston, TX (US); Nancy S. Borkowski, Lunenberg, MA (US); Patrick J. Fisseler, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 176 days.

(21) Appl. No.: 09/932,502

(22) Filed: Aug. 17, 2001

(65) Prior Publication Data

US 2002/0038849 A1 Apr. 4, 2002

Related U.S. Application Data

(60) Provisional application No. 60/236,478, filed on Sep. 29, 2000.

(51) Int. Cl.[7] .................................................. G01V 5/08
(52) U.S. Cl. ........................ 250/269.1; 250/269.4; 250/269.6
(58) Field of Search ................................... 250/256, 257, 250/269.1, 269.9, 269.2, 269.6, 269.3, 493.1, 497.1, 505.1; 378/114, 117

(56) References Cited

U.S. PATENT DOCUMENTS

| 3,461,291 A | | 8/1969 | Goodman |
| 3,492,481 A | | 1/1970 | Buck et al. |
| 3,885,160 A | * | 5/1975 | Dillingham .................. 376/191 |
| 3,906,233 A | * | 9/1975 | Vogel ........................... 378/65 |
| 4,027,156 A | * | 5/1977 | Robinet ....................... 378/117 |
| 4,093,854 A | * | 6/1978 | Turcotte et al. ............. 376/118 |
| 4,278,882 A | * | 7/1981 | Clayton et al. ............. 250/255 |
| 4,432,929 A | | 2/1984 | Bridges |
| 4,487,737 A | | 12/1984 | Bridges |
| 4,883,956 A | | 11/1989 | Melcher et al. |
| 5,046,078 A | * | 9/1991 | Hernandez et al. ......... 378/119 |
| 5,804,820 A | * | 9/1998 | Evans et al. ............. 250/269.6 |
| RE36,012 E | | 12/1998 | Loomis et al. |
| 5,894,503 A | * | 4/1999 | Shepherd et al. ........... 378/203 |
| 6,205,199 B1 | * | 3/2001 | Polichar et al. ............ 378/98.8 |
| 6,207,953 B1 | * | 3/2001 | Wilson ..................... 250/259.4 |
| 6,449,337 B1 | * | 9/2002 | Honda et al. ............... 378/117 |

* cited by examiner

Primary Examiner—Albert Gagliardi
(74) Attorney, Agent, or Firm—Victor H. Segura; Brigitte L. Jeffery; John J. Ryborg

(57) ABSTRACT

A method is disclosed for operating a well logging tool having a controllable radiation source operatively coupled to a power source. The method includes monitoring at least one condition in a wellbore, and operatively disconnecting the power source from the radiation source when the at least one condition changes. Also disclosed is a downhole measurement assembly, which includes a radiation source, a power source, and at least one interlock operatively connected between the power source and the radiation source, where the at least one interlock is adapted to selectively arm and disarm the radiation source.

48 Claims, 2 Drawing Sheets

METHOD AND APPARATUS FOR SAFELY OPERATING RADIATION GENERATORS IN WHILE-DRILLING AND WHILE-TRIPPING APPLICATIONS

CROSS RELATED INVENTIONS

This invention claims the benefit of U.S. Provisional Application No. 60/236,478, filed Sep. 29, 2000.

BACKGROUND OF THE INVENTION

1. Field of the Invention

The invention relates generally to a method and apparatus for safely operating radiation-emitting well tools. More specifically, the invention relates to methods and apparatus for preventing unintended operation of a controllable radiation source when a well logging tool is not disposed in a wellbore.

2. Background Art

Determining the porosity and fluid content of subsurface earth formations are critical elements in maximizing the profitability of oil and gas ("formation fluids") exploration. To that end, a variety of techniques have been developed. One of the more well known techniques involves irradiating the subsurface earth formations with high-energy neutrons and monitoring the resulting energy spectra. When neutrons bombard the formations surrounding the wellbore, they induce a radioactive response, generally in the form of neutrons and gamma radiation, which may be recorded by one or more detectors. Depending on the application, either or both types of radiation may be monitored. By using such techniques, it is possible to determine the porosity and fluid content of a given formation, which generally correspond to the amounts of various fluids that may be easily retrieved from a formation.

Various types of radiation sources have been used in well logging systems. For example, neutrons or gamma rays may be generated simply through the use of radioactive isotopes (which naturally decay over time), or an x-ray source may be used. Alternatively, neutrons may be generated through the controlled collision of energized particles in a manner analogous to a fusion reactor. Such a system is commonly referred to as a pulsed neutron generator. When using such a pulsed neutron generator, the formation surrounding the well logging instrument is subjected to repeated, discrete "bursts" of neutrons.

One such prior art pulsed neutron generator is described in U.S. Pat. No. 3,461,291 issued to Goodman and assigned to the assignee of the present invention. The neutron source described in the Goodman patent uses an accelerator tube in which charged particles, such as deuterium ions, are accelerated across a potential and contacted with a target element such as tritium. The reaction between the deuterium ions with the tritium target produces a discrete burst of monoenergetic neutrons at an energy level of about 14 MeV. Neutrons are produced (i.e., the neutron source is "active") when an external power source (which provides the accelerating potential) is activated, and neutrons are not produced (i.e., the neutron source is inactive) when the external power source is deactivated.

A serious concern with radiation sources in general, and pulsed neutron sources in particular, is exposure of personnel to the high energy, radioactive particles produced by the various sources. Depending on the type of radiation source used, a variety of methods to reduce such exposure have been implemented.

Currently, pulsed neutron systems are typically used in well logging tools to make measurements in two different ways. The first, known as "wireline logging," includes recording measurements in a formation of interest after a borehole has been drilled and the drill string (drilling tool assembly) has been removed from the borehole. Wireline logging includes lowering the well logging instrument into the wellbore at one end of an armored electrical cable and withdrawing the instrument while making measurements. There is a delay between the removal of the drill string and the beginning of well logging operations. As a result, the composition of the formation pore space may change, which may mask important data. However, in wireline logging, the instrument operator has total control over the neutron source, so there is little danger of accidental irradiation. Operating power is only applied to the neutron source when activated by the system operator, typically only when the well logging tool is safely below ground in the wellbore. Typically, then, very little radiation is produced when the logging tool is out of the wellbore and electrical power to the source is turned off by the instrument operator.

A second commonly used technique is known as measurement while drilling ("MWD") or logging while drilling ("LWD"). In MWD/LWD operations, measurements may be made during the drilling of the wellbore itself. MWD/LWD instrument systems allow acquisition of near-"real-time" data on the conditions inside the wellbore. U.S. Pat. No. Re. 36,012, issued to Loomis et al. and assigned to the assignee of the present invention, describes a MWD/LWD apparatus using a pulsed neutron source.

In most cases, however, MWD or LWD tools are not in direct communication with surface-based recording and control instruments, or have a very slow communication up-link. Additionally, down-links are typically rare, and if used, are usually slow. Thus, the electrical power sources which create the acceleration voltage in the controllable neutron source are not under the direct control of the instrument operator. Such lack of direct control can cause safety concerns. As previously explained, pulsed neutron generators and x-ray generators require a separate electrical power source to provide acceleration potential. When pulsed neutron or x-ray generators are used in well logging applications, power for the neutron and/or x-ray generator generally comes from either stored energy devices or via transmission from the surface. Stored energy devices are typically batteries, but may include other devices such as fuel cells. Stored energy devices provide power continuously until they become depleted. In MWD applications, surface power is typically conveyed via drilling fluid ("mud") flow down the drill pipe to a turbine in the MWD tool. In wireline tools, the armored electrical cable is used to provide the power to the electronic source.

When using stored energy devices in a well logging tool, particularly in MWD applications where direct control by the instrument operator is not available, the instrument operator may not be able to determine whether the neutron or x-ray generator is activated or not. In wireline logging or surface-powered MWD systems (such as turbine powered systems), the instrument operator does not have this problem because the operator can stop the power source at the surface. Thus, in wireline or surface-powered MWD systems, the operator maintains direct control over the power source and, thus, maintains control over the production of radiation. With stored energy devices, however, the operator has no such direct control and, thus, the risk of unintentionally exposing personnel to radiation is significantly greater.

What is needed, therefore, are techniques for preventing a controllable radiation source in logging tools, which are not under direct control of the instrument operator, from generating radiation when the logging tools are not in the wellbore.

SUMMARY OF THE INVENTION

One aspect of the present invention is a method of operating a well logging tool having a controllable radiation source operatively coupled to a power source. The method includes monitoring at least one downhole condition and sending a disarm signal from at least one interlock to the power source, when the condition in a wellbore changes from a predetermined condition. The disarm signal causes radiation generation to cease.

Another aspect of the present invention is a well logging tool which includes a controllable radiation source, a power source operatively coupled to the radiation source, and at least one interlock operatively connected to the power source.

Other aspects and advantages of the invention will be apparent from the following description and the appended claims.

DETAILED DESCRIPTION

The present invention provides a method and apparatus which can increase the safety of personnel near well logging instruments which include controllable radiation sources, such as pulsed neutron sources or x-ray sources. This invention relates to techniques for safely and reliably operating electrically powered radiation generators in while-drilling, while-tripping, and slick-line applications.

The techniques are designed to prevent the radiation source from operating when personnel might be exposed to radiation from the source, but otherwise enable operation of the source when measurements are required to be made inside a wellbore.

In order to prevent personnel from being exposed to radiation, the present invention uses a combination of techniques to increase safety. The techniques include, but are not limited to, shielding, external radiation monitoring, and using safety interlocks. Safety interlocks have previously been implemented with respect to well perforating tools, for example, but have not been implemented into electrically powered radiation sources.

An interlock, as used throughout the description of the invention, refers to any device which includes the following general elements: an input sensor which is able to detect a change in a parameter of the environment surrounding a radiation source; a logic pathway which enables the interlock to determine whether the radiation source should be armed or disarmed (able to operate or not); and an output signal which can arm or disarm the radiation source. The logic pathway may be mechanical, electrical, optical, software or micro-processor based device or system, or any combination of these.

In any type of well logging tool according to the invention, an electrical power source will only be operatively connected to the radiation source if all of the interlocks in the well logging tool, where multiple interlocks are used, operatively couple the power source to the radiation source. Multiple interlocks, each of which is designed to monitor a different environmental parameter, may be used in various embodiments of the present invention. Operative coupling of the power source to the radiation source, as used in the description of this invention, is intended to include, but is not limited to, causing the power source to generate electrical power, making an electrical connection between the power source and the radiation source, and causing control devices which actuate the radiation source to function. Such control devices include, for example, a high voltage supply circuit or pulsing circuit in the case of a pulsed neutron source. Furthermore, the interlock is not limited to providing electrical control between the power source and the radiation source. Such control mechanisms as magnetic, mechanical, electro-optical and optical are clearly within the scope of an interlock according to the invention.

Figure 1:
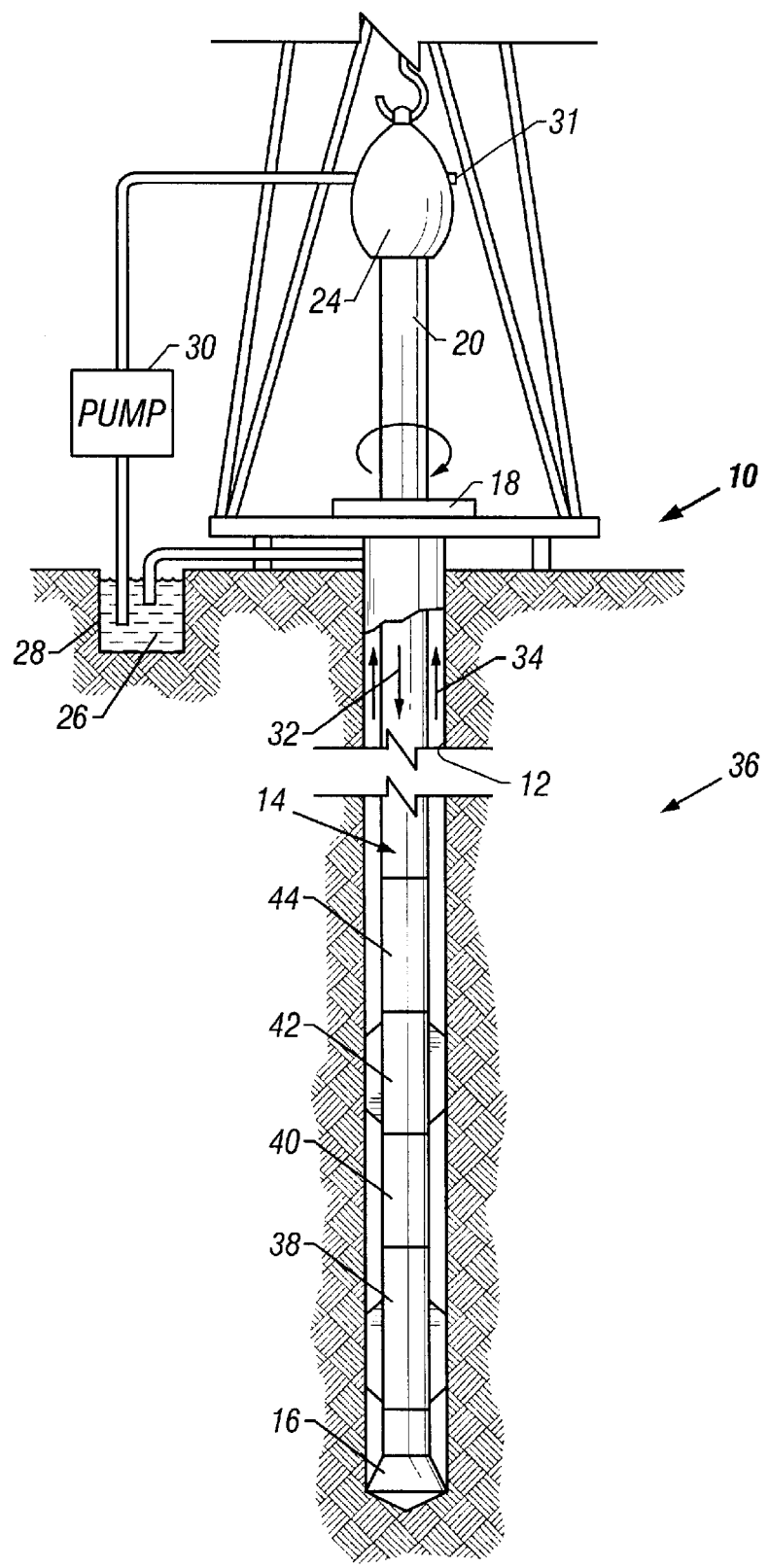
FIG. 1 is a schematic diagram of one embodiment of a measurement-while-drilling apparatus in accordance with the present invention.
Figure 2:
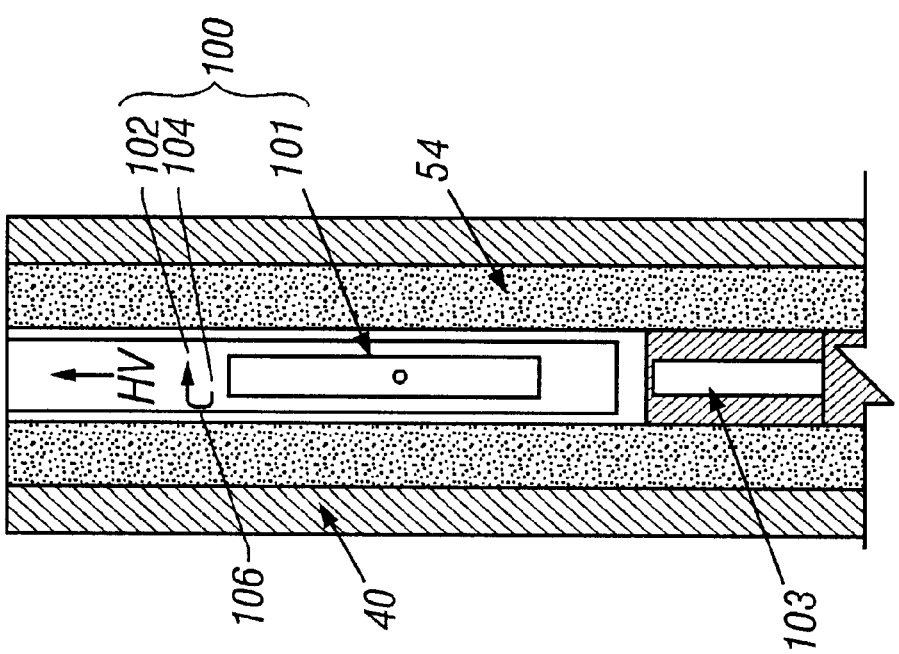
FIG. 2 is a cross-sectional view of one embodiment of a downhole measurement assembly in accordance with the present invention.

FIGS. 1 and 2 generally show the workings of an MWD system using a controllable radiation source in accordance with the present invention. In FIG. 1, a platform and derrick 10 are positioned over a borehole 12. A drill string 14 is suspended within the borehole 12 and includes a drill bit 16 at its lower end. The drill string 14 and the drill bit 16 attached thereto are rotated by a rotary table 18 which engages a kelly 20 at the upper end of the drill string 14. Other systems fur turning the drill string 14 include "top drive" (not shown in FIG. 1 or 2) of any type well known in the art. The drill string 14 is suspended from a hook 22 attached to a travelling block (not shown). The kelly 20 is connected to the hook 22 through a rotary swivel 24 which permits rotation of the drill string 14 relative to the hook 22. Drilling fluid (or "mud") 26 is contained in a mud pit 28 typically located adjacent to the derrick 10.

A pump 30 pumps the drilling fluid 26 into the drill string 14 via a port (not shown) in the swivel 24 to flow downward (as indicated by the flow arrow 32) through a center of the drill string 14. The drilling fluid 26 exits the drill string 14 via ports in the drill bit 16 and then circulates upward in the annulus between the outside of the drill string and the periphery of the bore hole, as indicated by the flow arrows 34. The drilling fluid 26 thereby lubricates the bit 16 and carries formation cuttings to the surface. The drilling mud 26 is then returned to the mud pit 28 for recirculation.

Mounted generally at the bottom end of the drill string 14 is a bottom hole assembly 36, which includes measurement assemblies. Typically, the bottom hole assembly 36 includes the drill bit 16, and extends in the upward direction to drill pipe (not shown separately) and may include a drill collar section 40, a stabilizer collar section 42, and a second drill collar section 44.

The drill collar section 40 is shown surrounding a tool chassis 54. Formed in the chassis 54 is a longitudinally extending mud channel 56 for conveying the drilling fluid 26 downward through the drill string 14. Eccentered to the other side of the chassis 54 is a controllable radiation source and measurement system, which together form a downhole measurement assembly 100. The measurement assembly 100 includes the controllable radiation source, which in this example is a pulsed neutron source 101 operatively coupled to a power source 102, and further includes a radiation detector 103. Additionally, at least one interlock 104 is operatively coupled to the power source 102. The at least one interlock 104 may be operatively coupled between the power source 102 and the neutron source 101 through any method known in the art. The at least one interlock 104 is adapted to disable operation of the neutron source 101 upon a selected environmental parameter changing from a predetermined condition.

The power source 102 may be any stored energy device known in the art, such as a battery or fuel cell. The detector 103 may be any radiation detector known in the art, such as a cerium-activated gadolinium orthosilicate (GSO) detector, as disclosed in U.S. Pat. No. 4,883,956, for example. The neutron source 101 may be any controllable source known in the art, such as a deuterium-tritium system disclosed in U.S. Pat. No. 3,461,291.

In this embodiment the at least one interlock 104 includes a sensor (not shown separately) comprising a sodium iodide (NaI) crystal coupled to a photomultiplier tube (not shown). This type of sensor is adapted to detect capture gamma-rays generated by the formation surrounding the downhole measurement assembly 100. In some embodiments, the sensor may include two or more such sensors spaced apart along the length of the downhole measurement assembly 100. This type of at least one interlock 104 operates corresponding to whether there is fluid surrounding the downhole measurement assembly 100. Thus, this type of at least one interlock 104 includes one type of a fluid immersion sensor. In this type of sensor, if the detector count rate drops below a predetermined level, or if a ratio of counting rates between two or more detectors changes by a selected amount (i.e., if the tool is raised above the liquid level in the wellbore), the at least one interlock 104 sends a command signal 105 (as indicated by the arrow 106) to the power source 102, which then disarms the neutron source 101. Disarming, as previously explained, can occur in any of several different ways. For example, the command signal 105 can cause the power source 102 to interrupt the flow of power to the neutron source 101. Alternatively, the command signal 105 may cause the power source 102 to shut off or otherwise deactivate. Thus, in some fashion, the power source 102 is operatively disconnected from the neutron source 101, or the neutron source 101 is operatively disabled Regardless of the form of operative disconnection or disablement, neutrons are not generated by the neutron source 101 in the downhole assembly 100 once the power source 102 or neutron source 101 has been disarmed (or otherwise operatively disconnected from the neutron source 101), which can prevent radiation exposure to personnel on the rig upon removal of the downhole assembly 100 from a wellbore. Other types of sensors may be used instead of NaI in the immersion-detection interlock system described above. For example, a $^3$He counter or a GSO detector may be used. Other types of sensors which may be used in other embodiments of the interlock 104 will be explained below with respect to a downhole measurement assembly which includes more than one such interlock.

Figure 3:
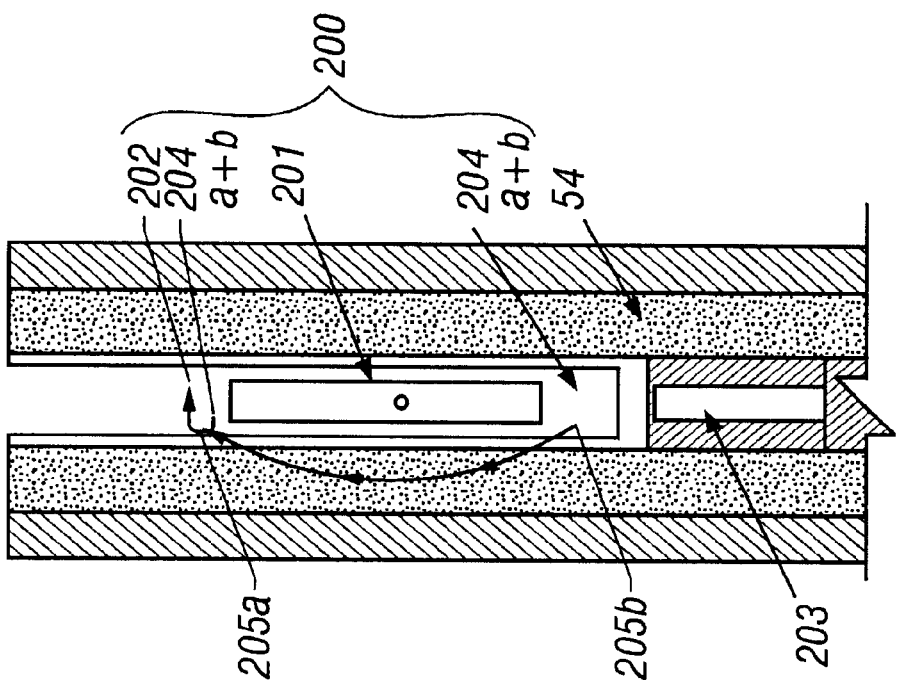
FIG. 3 is a schematic diagram of one embodiment of a downhole measurement assembly in accordance with the present invention.

In another embodiment, more than one interlock may be used. FIG. 3 illustrates such a system. In this example, a downhole measurement assembly 200 is adapted for use in MWD applications. Specifically, the downhole measurement assembly 200 includes a controllable radiation source 201 operatively coupled to a power source 202, and includes a detector 203. Additionally, first and second interlocks 204*a* and 204*b* are operatively coupled to the power source 202. The power source 202 may be any stored energy system known in the art, such as a battery or fuel cell, just as for the previous embodiment. The detector 203 may be any radiation detector commonly known in the art, such as a cerium-activated gadolinium orthosilicate (GSO) detector, NaI detector or $^3$He detector, just as in the previous embodiment. The radiation source 201 may be any source known in the art, such as an x-ray generator, or pulsed neutron source as in the previous embodiment.

In this particular embodiment, the first interlock 204*a* is a pressure sensor located in an internal mud channel (not shown) within the downhole measurement assembly 200. The second interlock 204*b* is a temperature sensor located on the body of the downhole measurement assembly 200. When the downhole measurement assembly 200 is operating within a wellbore (not shown), both the pressure and the temperature are typically within predetermined ranges. Should the pressure drop below the predetermined range, the first interlock 204*a* sends a command signal 205*a* to the power source 202, disarming or otherwise deactivating the radiation source 201. Correspondingly, if the temperature drops below the predetermined range, the second interlock 204*b* sends a command signal 205*b* to the power source 202, causing the power source 202 to disarm or otherwise deactivate the radiation source 201, as described above. Also, either the pressure sensor or the temperature sensor described above may be used singly as an interlock, as in the first embodiment.

Another embodiment of a sensor for an interlock according to the invention includes a magnetic proximity sensor. Such a sensor may be used to detect when the downhole measurement assembly is proximate to magnetically susceptible materials, such as a steel casing typically used to complete a wellbore. In this embodiment, the magnetic proximity sensor may be programmed to deactivate or operatively uncouple the power source 202 from the radiation source 201 when the downhole measurement assembly 200 is not disposed inside casing, or proximate to rig equipment (much of which is typically made from steel). Magnetic proximity sensors are known in the art. As in the first embodiment, the magnetic proximity sensor may be used in a single interlock or as a sensor in one of a plurality of such interlocks.

Other downhole parameters can serve as the basis for operating any of the interlock systems described above. For example, one embodiment of the interlock may include a sensor that monitors a distance from the tool to a wall of a formation (i.e., a caliper). If the distance increases above a predetermined amount, the interlock sends a signal which disarms the radiation source or otherwise operatively uncouples the power source from the radiation source. Caliper devices of several different types for use in well logging instruments are well known in the art, one example of which is an acoustic caliper. In another embodiment, the interlock may include a sensor which monitors the flow rate of the drilling mud (26 in FIG. 1). In the event that the mud flow rate falls below a predetermined amount, the interlock sends a signal disarming the radiation source.

Further, in other embodiments, the interlock may include a sensor which monitors a collar connection (i.e., if the drill collar including the downhole measurement assembly is disconnected from the drill string, the interlock disarms the radiation source) or monitors other common wellbore conditions. Any combination of the above sensors may also be used with multiple interlocks, as previously explained, to provide redundant back-up interlock systems. As discussed above, the interlocks may also be used in conjunction with shielding devices or external radiation monitoring devices, depending on the particular application.

Additionally, an interlock according to the present invention is not limited to monitoring a downhole environmental parameter. For example, an interlock may comprise a timer coupled to a signaler. In such an embodiment, an operator enters a specific duration of time (i.e., the approximate number of hours that the tool is to be downhole) into the timer. Once the specific duration of time has elapsed, the interlock sends a signal to the power source, disarming the radiation source. This type of interlock is referred to in this application as a surface operable interlock, because the timer may be initialized at the earth's surface, before inserting the tool into the wellbore.

Analogously to the downhole interlocks, multiple surface operable interlocks may be used to provide redundant safety systems. In one embodiment, a first surface operable interlock comprises a "software" arming key, which is a transmittable code that is entered into the downhole measurement assembly by the instrument operator. In order to operate correctly, the downhole measurement assembly must at some point in time be operatively connected to a surface recording system to provide programming and to synchronize internal clocks and memories, as is known in the art. Typically, a surface communication port provides an operative connection between surface recording and control equipment (not shown in the Figures) to the downhole measuring assembly. An electrical cable is typically plugged into the communication port to establish electrical connection between the surface system and the downhole measuring assembly. After the operator enters the software arming key, the downhole measuring assembly may be activated. Prior to entering the software arming key, the downhole measuring assembly is programmed so that the radiation source will not operate, even if one of the previously described sensor-type interlocks detects a condition which would otherwise actuate the radiation source. At any point during the operation of the well logging tool, such as after retrieval of the tool from the wellbore, the instrument operator may send a corresponding software disarming key via the operative connection, which causes the downhole measuring assembly to deactivate.

Another type of arming key is a so-called "hardware" arming key. This may take the form of a plug (not shown) or other type of device used to seal and close the communication port in the logging tool. Some embodiments of the plug may include electrical jumper pins or leads which enable activation of the radiation source by appropriate internal electrical or mechanical connection. Other embodiments of the plug or key may include a magnet therein and a magnetically operated switch disposed in the tool in the vicinity of the communication port. In one embodiment, the system operator will affix an "enabling" communication port plug to the logging tool when the tool is to be inserted into the wellbore. During times when the logging tool is not intended to be inserted into the wellbore, a different plug, which does not include enabling mechanical and/or electrical connections thereon, may be inserted into the tool. This would prevent unintended operation of the radiation source, even if other interlocks, such as the previously described time delay and sensor-based devices were to indicate that radiation source operation was acceptable.

A second surface operable interlock comprises an automatic interlock which determines "end-of-job" conditions. One such "end-of-job" condition may be detection of a "data dump." For example, when drilling and measuring are completed, the data accumulated during the drilling are typically "dumped" (i.e. downloaded) into a data storage device, this storage device typically being part of the previously mentioned surface control and recording system (not shown). This data "dump" may be considered to be one indicator of an "end-of-job" condition. For example, the downhole measuring assembly could be programmed so that the radiation source will not operate after detection of a data dump, until an instrument initialization is later performed by the instrument operator. A second end-of-job condition may include the timer, as discussed above. Thus, once the second surface operable interlock determines that an "end-of-job" condition has occurred, the second surface interlock will automatically send a signal to disconnect the power source from the radiation source. The second surface operable interlock may be operatively coupled to the surface communication port, a data storage device, and the downhole measurement assembly.

This second surface operable interlock may be provided to function in the event that an operator accidentally forgets to transmit a disarm key, as described earlier herein. Additionally, combinations of downhole and surface operable interlocks, such as the ones previously described, may be used. For example, any one or more of the downhole interlocks described above may be used in conjunction with any one ore more of the surface interlocks.

In one example embodiment, a first downhole interlock comprising a flow sensor coupled to an internal mud channel is used in conjunction with the first surface operable interlock and the second surface operable interlock described above. In the event that mud flow ceases, the first downhole interlock sends a signal to the power source, causing radiation generation to stop. Because of the redundant nature of the interlocks, even in the event of a particular interlock failing or otherwise being falsely actuated, the risk of radiation exposure to rig personnel is greatly reduced when compared to systems lacking such interlocks.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A downhole measurement assembly, comprising:
 a support adapted for disposal within a wellbore traversing a subsurface formation;
 a controllable radiation source mounted on the support;
 a power source mounted on the support; and
 at least one interlock operatively connected between the power source and the radiation source, the at least one interlock adapted to autonomously arm or disarm the radiation source based on the detection of a predetermined condition.

2. The downhole measurement assembly of claim 1, wherein the at least one interlock comprises a fluid immersion sensor.

3. The downhole measurement assembly of claim 1, wherein the at least one interlock comprises a pressure sensor.

4. The downhole measurement assembly of claim 1, wherein the at least one interlock comprises a temperature sensor.

5. The downhole measurement assembly of claim 1, wherein the at least one interlock comprises a proximity sensor.

6. The downhole measurement assembly of claim 1, wherein the at least one interlock comprises a fluid flow sensor.

7. The downhole measurement assembly of claim 1, wherein the at least one interlock comprises a collar connection sensor.

8. The downhole measurement assembly of claim 1, wherein the at least one interlock comprises a magnetic proximity sensor.

9. The downhole measurement assembly of claim 1, further comprising at least one surface operable interlock.

10. The downhole measurement assembly of claim 9, wherein the at least one surface operable interlock comprises an end-of-job detector.

11. The downhole measurement assembly of claim 9, wherein the at least one surface operable interlock comprises an arming/disarming key operatively coupled to the power source.

12. The downhole measurement assembly or claim 11 wherein the arming/disarming key comprises a predetermined code communicated to a controller in the downhole measurement assembly.

13. The downhole measurement assembly of claim 11 wherein the arming/disarming key comprises a hardware key.

14. The downhole measurement assembly of claim 1, wherein the radiation source comprises a pulsed neutron source.

15. The downhole measurement assembly of claim 1, wherein the radiation source comprises an x-ray source.

16. The downhole measurement assembly of claim 1 wherein the power source comprises at least one battery.

17. The downhole measurement assembly of claim 1 wherein the power source comprises a fuel cell.

18. The downhole measurement assembly of claim 1 wherein the power source comprises a turbine.

19. A downhole measurement assembly, comprising:
   a support adapted for disposal within a wellbore traversing a subsurface formation:
   a controllable pulsed neutron source mounted on the support, the neutron source comprising a neutron accelerator and a power source operatively coupled thereto; and
   at least one interlock operatively connected between the electric power source and the neutron accelerator, the at least one interlock adapted to autonomously arm or disarm the neutron accelerator based on the detection of a predetermined condition.

20. The downhole measurement assembly of claim 19, wherein the at least one interlock comprises a fluid immersion sensor.

21. The downhole measurement assembly of claim 19, wherein the at least one interlock comprises a pressure sensor.

22. The downhole measurement assembly of claim 19, wherein the at least one interlock comprises a temperature sensor.

23. The downhole measurement assembly of claim 19, wherein the at least one interlock comprises a proximity sensor.

24. The downhole measurement assembly of claim 19, wherein the at least one interlock comprises a fluid flow sensor.

25. The downhole measurement assembly of claim 19, wherein the at least one interlock comprises a collar connection sensor.

26. The downhole measurement assembly of claim 19, wherein the at least one interlock comprises a magnetic proximity sensor.

27. The downhole measurement assembly of claim 19, further comprising at least one surface operable interlock.

28. The downhole measurement assembly of claim 27, wherein the at least one surface operable interlock comprises an end-of-job detector.

29. The downhole measurement assembly of claim 27, wherein the at least one surface operable interlock comprises an arming/disarming key operatively coupled to the power source.

30. The downhole measurement assembly of claim 29 wherein the arming/disarming key comprises a predetermined code communicable to a controller in the downhole measurement assembly.

31. The downhole measurement assembly of claim 29 wherein the arming/disarming key comprises a hardware key.

32. The downhole measurement assembly of claim 19, wherein the at least one downhole interlock comprises a fluid flow sensor.

33. The downhole measurement assembly of claim 19 wherein the power source comprises at least one battery.

34. The downhole measurement assembly of claim 19 wherein the power source comprises a fuel cell.

35. The downhole measurement assembly of claim 19 wherein the power Source comprises a turbine.

36. A method for operating a well logging tool adapted for disposal within a wellbore traversing a subsurface formation and having a radiation source operatively coupled to a power source therein, comprising:
   monitoring at least one condition in the wellbore or the tool; and
   the tool autonomously disconnecting the power source from the radiation source when the at least one condition changes from a predetermined condition.

37. The method of claim 36, wherein the at least one condition comprises a level of fluid immersion.

38. The method of claim 36, wherein the at least one condition comprises pressure.

39. The method of claim 36, wherein the at least one condition comprises temperature.

40. The method of claim 36, wherein the at least one condition comprises a distance from the tool to a formation wall.

41. The method of claim 36, wherein the at least one condition comprises fluid flow rate through the tool.

42. The method claim 36, wherein the at least one condition comprises elapsed time.

43. The method of claim 36, wherein the at least one condition comprises a collar being connected to a drill string.

44. The method of claim 36 wherein the at least one condition comprises proximity of the logging tool to a magnetically susceptible material.

45. The method of claim 36 further comprising the tool autonomously disconnecting the power source from the radiation source when a selected condition at the earth's surface occurs.

46. The method of claim 45 wherein the selected condition comprises time elapsed from a selected time.

47. The method of claim 45 wherein the selected condition comprises detection of an arming code in the well logging tool.

48. The method of claim 45 wherein the selected condition comprises detection of a hardware key inserted into the well logging tool.

* * * * *

UNITED STATES PATENT AND TRADEMARK OFFICE
CERTIFICATE OF CORRECTION

PATENT NO. : 6,649,906 B2  Page 1 of 1
DATED : November 18, 2003
INVENTOR(S) : Robert A. Adolph et al.

It is certified that error appears in the above-identified patent and that said Letters Patent is hereby corrected as shown below:

Title page,
Item [73], Assignee, following "Schlumberger Technology Corporation", add
-- Japan National Oil Corporation, Tokyo, Japan --.

Signed and Sealed this

Twentieth Day of December, 2005

JON W. DUDAS
*Director of the United States Patent and Trademark Office*